(No Model.)
H. D. BABCOCK.
GRATE SUPPORT FOR FURNACES.
No. 472,780. Patented Apr. 12, 1892.
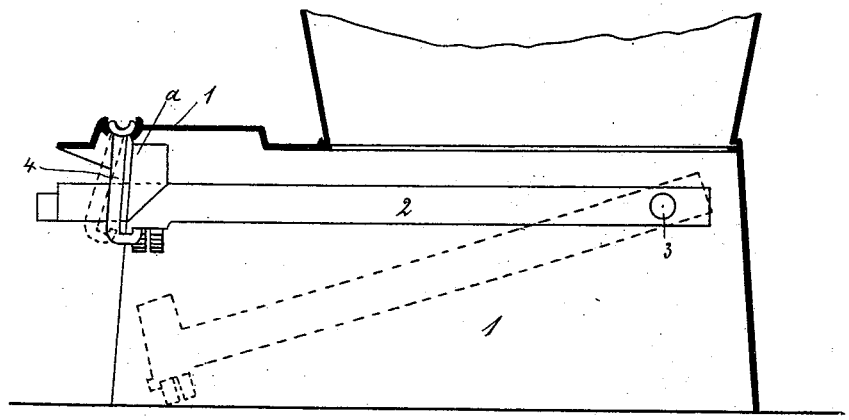
Fig. 1.
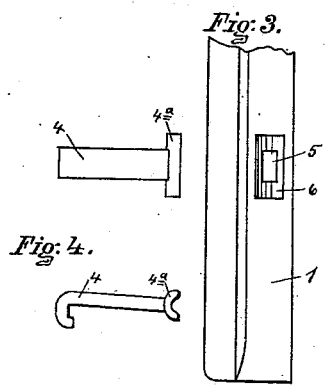
Fig. 3.
Fig. 4.
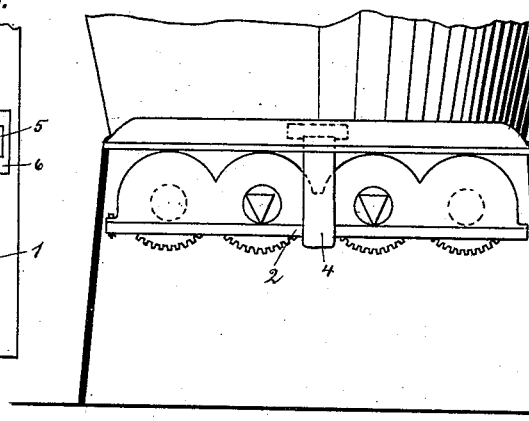
Fig. 2.
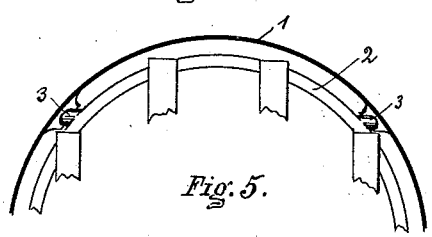
Fig. 5.
WITNESSES.
Rich. A. George
M. E. Robinson
INVENTOR.
H. D. Babcock
B. y Risley Perry
Attys

UNITED STATES PATENT OFFICE.

HENRY D. BABCOCK, OF LEONARDSVILLE, NEW YORK.

GRATE-SUPPORT FOR FURNACES.

SPECIFICATION forming part of Letters Patent No. 472,780, dated April 12, 1892.

Application filed June 3, 1891. Serial No. 394,840½. (No model.)

*To all whom it may concern:*

Be it known that I, HENRY D. BABCOCK, a citizen of the United States, and a resident of Leonardsville, in the county of Madison and State of New York, have invented certain new and useful Improvements in Grate-Supports for Furnaces; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in grate-supporting devices for hot-air furnaces.

In the drawings which accompany and form part of this specification, and in which similar letters and figures of reference refer to corresponding parts in the several figures, Figure 1 shows a sectional view of the base portion of a hot-air furnace having my improvements. Fig. 2 shows a front elevation of the same. Fig. 3 shows a top view of a portion of the furnace-base by which the supporting device is secured. Fig. 4 shows an edge and back view of the supporting hook or catch. Fig. 5 shows a section of the furnace-base and a top view of the rear portion of the grate-frame.

Referring more specifically to the reference-numerals marked on the drawings in a more particular description of the device, 1 indicates the base portion of a furnace, in which is mounted a frame 2, in which the grate-bars are mounted. The rear end of the grate-frame is supported or pivoted in the base at 3 at both sides of the rear end, and the front end is supported by a central hook or catch 4, which catch is provided with a semicircular sleeve-shaped shank $4^a$. The hook or catch 4 is broad in cross-section, and is inserted through an opening 5, of substantially the same length as the width of the hook. Surrounding the opening 5 is a semicircular groove or recess 6, adapted to receive the shank $4^a$ of the hook and permit the free end of the hook to be vibrated in a line from front to rear of the furnace, and still the shank $4^a$ will entirely close the opening 5 and shut off all communication from the upper side through the opening, no matter in what position the hook may be. The hook 4 engages the grate-frame 2 in the central front end. By releasing the hook 4 from the front end of the grate-bar the front end of the grate-bar may be tilted or let down, as shown in dotted lines in Fig. 1, to dump the grate. The arrangement of parts is preferably such that the portion of the grate-bar indicated by $a$ will engage on the nose of the hook and automatically open the hook as the grate-bar is swung up, and the hook will swing under and secure the grate-bar frame when it is raised to its uppermost position. It will be readily understood that hook 4 may be inserted and removed through the opening 5, and that it is unsecured except as it hangs through the opening 5 in the semicircular recess 6.

I do not claim, broadly, the idea of a hook for supporting the front end of a grate-bar frame; but What I do claim as new, and desire to secure by Letters Patent, is—

1. The combination, with a base of a furnace, of a grate-bar frame pivotally supported at its rear end in the base and the hook 4 for supporting the front end of the grate-bar frame, having a semicircular sleeve-shaped shank engaging in a semicircular recess in the base, substantially as set forth.

2. The combination, with a furnace-base having a hook perforation or opening with a semicircular recess surrounding it, of a central grate-supporting hook having a semicircular sleeve-shaped shank adapted to engage in the recess, the hook being adapted to be inserted through the opening, substantially as set forth.

In witness whereof I have affixed my signature in presence of two witnesses.

HENRY D. BABCOCK.

Witnesses:
M. E. ROBINSON,
JOHN S. CASEY.